(12) United States Patent
Jones (10) Patent No.: US 7,734,829 B2
(45) Date of Patent: Jun. 8, 2010

(54) METHODS, SYSTEMS, AND COMPUTER PROGRAM PRODUCTS FOR TRANSPARENTLY CONTROLLING COMMUNICATIONS BETWEEN NETWORK APPLICATIONS AND A PLURALITY OF NETWORK COMMUNICATIONS PROTOCOL STACKS USING DEFERRED PROTOCOL STACK ASSOCIATION

(75) Inventor: James Gregory Jones, Raleigh, NC (US)

(73) Assignee: EMC Corporation, Hopkinton, MA (US)

( * ) Notice: Subject to any disclaimer, the term of this patent is extended or adjusted under 35 U.S.C. 154(b) by 1703 days.

(21) Appl. No.: 10/864,266

(22) Filed: Jun. 9, 2004

(65) Prior Publication Data

US 2005/0276281 A1 Dec. 15, 2005

(51) Int. Cl.
*G06F 15/16* (2006.01)
(52) U.S. Cl. .................. 709/250; 709/227; 709/228
(58) Field of Classification Search ............. 709/227, 709/228, 250
See application file for complete search history.

(56) References Cited

U.S. PATENT DOCUMENTS

| | | | | |
|---|---|---|---|---|
| 6,111,894 | A * | 8/2000 | Bender et al. | 370/469 |
| 6,119,170 | A * | 9/2000 | Schoffelman et al. | 709/244 |
| 6,684,368 | B1 * | 1/2004 | Hull et al. | 715/209 |
| 6,785,674 | B2 * | 8/2004 | Vu | 707/3 |
| 6,954,784 | B2 * | 10/2005 | Aiken et al. | 709/220 |
| 7,275,152 | B2 * | 9/2007 | Goud et al. | 713/2 |
| 7,313,623 | B2 * | 12/2007 | Elzur et al. | 709/227 |
| 7,373,500 | B2 * | 5/2008 | Ramelson et al. | 713/150 |
| 7,415,513 | B2 * | 8/2008 | Connor et al. | 709/220 |
| 7,596,634 | B2 * | 9/2009 | Mittal et al. | 709/250 |
| 2004/0210663 | A1 * | 10/2004 | Phillips et al. | 709/230 |
| 2004/0250059 | A1 * | 12/2004 | Ramelson et al. | 713/150 |
| 2005/0015396 | A1 * | 1/2005 | Vu | 707/100 |
| 2005/0060414 | A1 * | 3/2005 | Phillips et al. | 709/227 |
| 2005/0060427 | A1 * | 3/2005 | Phillips et al. | 709/238 |
| 2005/0138114 | A1 * | 6/2005 | Connor et al. | 709/203 |

(Continued)

OTHER PUBLICATIONS

"Extend File Server Life Through TOE Acceleration," Alacritech, p. 1-4 (2004).

(Continued)

*Primary Examiner*—Patrice Winder
*Assistant Examiner*—Thomas Duong
(74) *Attorney, Agent, or Firm*—Jenkins, Wilson, Taylor & Hunt, P.A.

(57) ABSTRACT

Methods, systems, and computer program products for controlling communications between network applications and multiple network communications protocol stacks using deferred protocol stack association are disclosed. In one method, a socket creation function call is received from an application. A socket creation function call is terminated, a pseudo communications endpoint is created, and a socket descriptor corresponding to the pseudo communications endpoint is returned to the application. At least one subsequent sockets-related function call is received. Based on the subsequent sockets-related function call, it is determined whether the application is a client or a server. In response to determining that the application is a server, communications endpoints are created on each of the network communications protocol stacks and server-related sockets function calls are made to each of the underlying protocol stacks. In response to determining that the application is a client, a protocol stack is selected, a protocol-stack-specific communications endpoint is created, and client-related sockets function calls are made to the underlying protocol-stack.

53 Claims, 8 Drawing Sheets

U.S. PATENT DOCUMENTS

2006/0098653 A1* 5/2006 Adams et al. ............... 370/389

OTHER PUBLICATIONS

"SLIC Technology® Overview," http://www.alacritech.com/html/tech_review.html, Alacritech, p. 1-4 (2000-2004).

"TCP/IP Offload Engine (TOE) Analyzer Software," http://www.alacritech.com/html/toeanalyzer_main.html, Alacritech, p. 1-2 (2000-2004).

"TNIC Comparisons," http://www.alacritech.com/html/comparisons_tnic.html, Alacritech, p. 1 (2000-2004).

"Top 10 Reasons for a Server TCP Offload Engine (TOE) NIC (TNIC)," http://www.alacritech.com/html/toe_top_ten.html, Alacritech, p. 1-3 (2000-2004).

"2003 Press Releases," http://www.alacritech.com/html/061603toeanalyzer.html, Alacritech, p. 1-2 (2000-2004).

"Maximizing HP StorageWorks NAS Performance and Efficiency with TCP/IP Offload Engine (TOE) Accelerated Adapters," Hewlett-Packard Company, p. 1-8 (Mar. 2003).

* cited by examiner

METHODS, SYSTEMS, AND COMPUTER PROGRAM PRODUCTS FOR TRANSPARENTLY CONTROLLING COMMUNICATIONS BETWEEN NETWORK APPLICATIONS AND A PLURALITY OF NETWORK COMMUNICATIONS PROTOCOL STACKS USING DEFERRED PROTOCOL STACK ASSOCIATION

TECHNICAL FIELD

The present invention relates to methods, systems, and computer program products for controlling communications between network applications and a plurality of network communications protocol stacks. More particularly, the present invention includes methods, systems, and computer program products for transparently controlling communications between network applications and a plurality of network communications protocol stacks using deferred protocol stack association.

BACKGROUND ART

In computer networks, application programs communicate with other application programs through network communications protocol stacks, such as TCP/IP protocol stacks. Network communications protocol stacks are usually implemented in software that is part of computer operating systems. Network applications access network communications protocol stacks via function calls provided by application programming interfaces (APIs) to the computer operating systems. One common application programming interface for accessing network communications protocol stacks is referred to as the sockets application programming interface. The sockets application programming interface was originally developed by the University of California at Berkeley as an interface to the TCP/IP protocol stack of the Berkeley UNIX operating system. AT&T developed a similar interface, based on a streams implementation referred to as Transport Layer Interface or (TLI), for the System V UNIX operating system. The Berkeley sockets interface has been adapted for use with the WINDOWS™ operating system. The WINDOWS™ version is often referred to as WINDOWS™ Sockets or Winsock.

The term "socket," as used herein, refers to a data structure identified by a descriptor that an application uses to communicate with a remote application via a local communications protocol stack and is not intended to be limited to any operating-system-specific data structure. A socket may be created using a socket creation function call provided by a sockets API or a streams function call provided by a streams API. The function call returns a socket descriptor to the calling application that the application uses to send and receive data over a network in a manner similar to the way that an application reads and writes data to a file using a file descriptor. The term "sockets layer," as used herein, is not intended to be limited to any operating-system-specific transport interface and instead is intended to refer generically to an application programming interface for accessing a network communications protocol stack, such as the sockets API or the streams transport layer interface (TLI).

Figure 1:
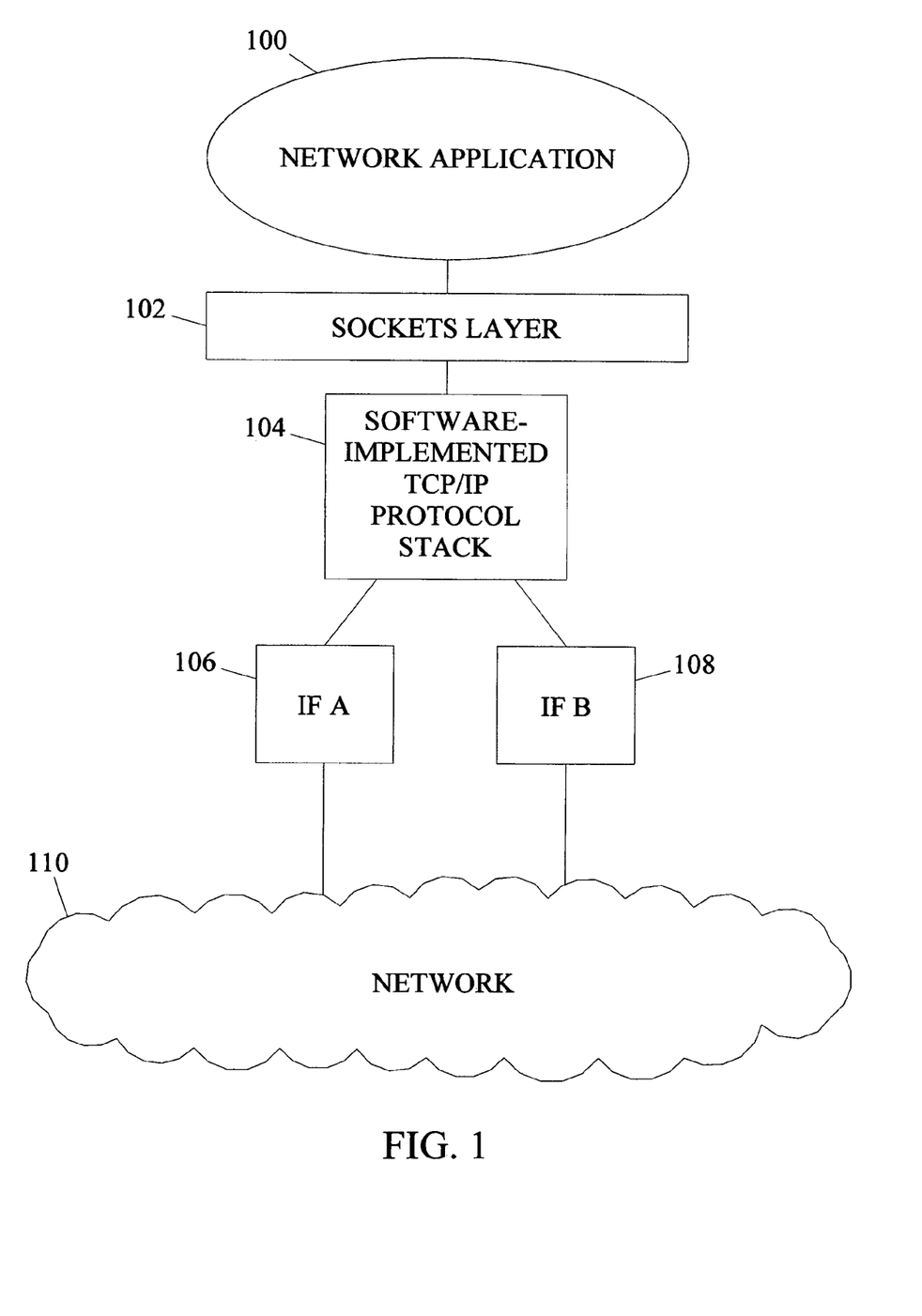
FIG. 1 is a block diagram illustrating a conventional software-implemented network communications protocol stack, a sockets layer, and a network application.

Communications protocol stacks, sockets layers, and applications are typically implemented in different software layers. FIG. 1 illustrates a network application, a sockets layer, and a software-implemented network communications protocol stack. Referring to FIG. 1, network application 100 may be a client or a server that desires to communicate with other applications over a computer network. A sockets layer 102 provides sockets-related function calls that allow network application 100 to access a network communications protocol stack 104. In the illustrated example, network communications protocol stack 104 is a TCP/IP protocol stack. TCP/IP protocol stack 104 implements reliable, connection-oriented communications over an unreliable network. Exemplary functions performed by TCP/IP protocol stack include connection establishment and tear-down, message sequencing, timeout and retransmission, congestion control, and network layer routing. TCP/IP protocol stack 104 accesses underlying network 110 via network interfaces 106 and 108. Network interfaces 106 and 108 may be any suitable physical layer interfaces, such as Ethernet interfaces, for sending and receiving data over underlying network or networks 110. For example, network interfaces 106 and 108 may be connected to different IP subnets.

One problem with the architecture illustrated in FIG. 1 is that network communications protocol stack 104 consumes a large amount of processor cycles. For example, a TCP/IP protocol stack 104 implements connection establishment and tear-down, timeouts, retransmission, and other functions for each connection implemented through TCP/IP protocol stack 104. If network application 100 is a server, network application 100 may have multiple simultaneous connections through TCP/IP protocol stack 104. Concurrency can also exist in network clients, again resulting in multiple simultaneous connections through protocol stack 104. As a result, the processing required to implement TCP/IP protocol stack 104 is multiplied by the number of simultaneous connections. The processor that executes the instructions that implement TCP/IP protocol stack 104 becomes overloaded and the time for network application 100 to service each connection is increased.

In order to avoid the processor overload conditions that can be caused by software-implemented network communications protocol stacks, portions of network communications protocol stacks have been implemented in hardware. For example, hardware-implemented network communications protocol stacks, referred to as TCP offload engines or TOEs, move the data path of the network communications protocol stack to hardware, while the control portion of the network communications protocol stack is implemented in software. Moving the data path of the network communications protocol stack into hardware frees processor cycles to perform other functions, such as accepting more connections or performing application functions.

Figure 2:
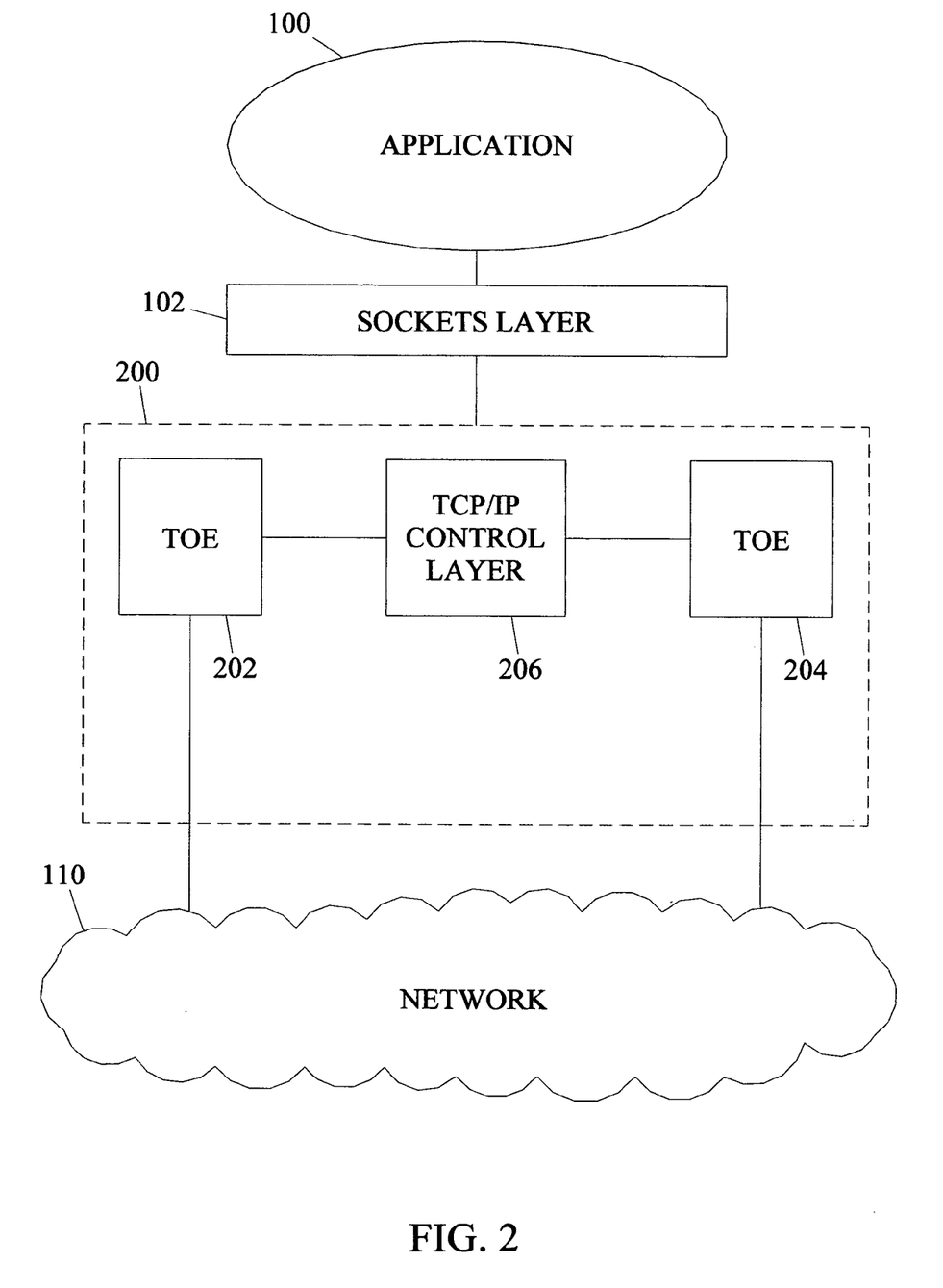
FIG. 2 is a block diagram of a conventional single protocol stack implementation in which portions of the TCP/IP protocol stack have been moved to TCP offload engines.

FIG. 2 is an example of a network communications protocol stack in which portions of the processing required for implementing the network communications protocol stack have been moved to hardware. Referring to FIG. 2, network communications protocol stack 200 includes TCP offload engines 202 and 204 that implement the data path portion of the TCP/IP protocol stack and a TCP/IP control layer 206 that implements the control portion of the TCP/IP protocol stack. TCP offload engines 202 and 204 may be implemented in hardware and may include integrated network interfaces for communicating over network 110. The data path portion of the TCP/IP protocol stack that may be implemented by TCP offload engines 202 and 204 may include sending and receiving data over network 110. The control portion of the TCP/IP protocol stack implemented by TCP/IP control layer 206 may include connection setup, connection tear down, and exceptions handling. TCP control layer 206 may be implemented in software. TCP/IP offload engines 202 and 204 share state information with TCP control layer 206. By off-loading portions of the TCP/IP protocol stack to hardware, the architecture illustrated in FIG. 2 increases the communication efficiency between application 100 and other applications.

Even though the architecture illustrated in FIG. 2 includes multiple TCP offload engines, the architecture functions as a single TCP/IP protocol stack, and a socket is associated with protocol stack when the socket is created. For example, when application 100 makes a socket creation function call via sockets layer 102, a socket is created and associated with protocol stack 206. This association is fixed for the life of the socket and cannot be altered using existing sockets APIs. While such an architecture may be useful in certain situations, future architectures may include multiple TCP/IP protocol stacks. However, because sockets layer 102 fixes the association between a socket and a communications protocol stack at socket creation time, an application can only communicate with remote applications over one protocol stack. If data arrives over a different protocol stack from the protocol stack with which the application's socket is associated, the data will not reach the application. Alternatively, the application must create a socket for each protocol stack, requiring the application to be aware of each protocol stack in the system. Requiring the application to be aware of each protocol stack in the system greatly increases the complexity of application design.

Accordingly, there exists a long felt need for methods, systems, and computer program products for controlling communications between network applications and a plurality of network communications protocol stacks.

DISCLOSURE OF THE INVENTION

According to one aspect, the present invention includes a method for transparently controlling communications between a network application and a plurality of network communications protocol stacks using deferred protocol stack association. According to this method, an application makes a function call to create a socket. Rather than immediately making the association between the socket and the network communications protocol stack in response to the socket creation function call, the method includes deferring association between the socket and the network protocol stack and creating a pseudo communications endpoint. As used herein, the term "pseudo communications endpoint" refers to a data structure implemented in a protocol layer that resides between the application layer and a plurality of network communications protocol stacks. In one exemplary implementation, the pseudo communications endpoint may be implemented in a protocol layer between the sockets layer and the network communications protocol stacks. In another exemplary implementation, the pseudo communications endpoint may be implemented in an application library that resides between the application and the sockets layer. In a third exemplary implementation, the pseudo communications endpoint may be implemented as a pseudo transport driver implemented as a streams multiplexer between the application's stream and the underlying protocol stacks. In a sockets environment the pseudo communications endpoint may include stack-specific state block used to store information regarding subsequently created protocol-stack-specific communications endpoints. In a streams environment, the pseudo communications endpoint is contained within the pseudo transport driver and is used to store information regarding subsequently created protocol-stack-specific streams and the associated communications endpoints.

The layer in which the pseudo communications endpoint is created is referred to herein as the stack multiplexer layer. The stack multiplexer layer controls communications between a network application and a plurality of network protocol stacks. The stack multiplexer layer may be implemented in hardware, software, firmware, or any combination thereof. As stated above, the stack multiplexer layer may be located between the sockets layer and the communications protocol stacks in the socket or streams environments or between the application and the sockets layer as an application level library.

When the application makes a standard socket creation function call, the stack multiplexer layer terminates the original socket creation call, creates a pseudo communications endpoint and returns a socket descriptor to the application. The application then uses the pseudo communications endpoint in making subsequent function calls. The stack multiplexer layer receives the calls, terminates the calls, returns the appropriate values to the calling application, and uses the calls to determine whether the application is a client or a server. For example, if the application is a server, the application may execute a listen function call to indicate it wishes to accept new connections on this socket. Since client applications typically do not call listen, the stack multiplexer layer may identify an application that executes a listen function call as a server. If the application is determined to be a server, the stack multiplexer layer may create a plurality of protocol-stack-specific communications endpoints via socket attach function calls to the network communications protocol stacks. In a sockets environment, a socket attach function call is a function call made by the kernel to a communications protocol stack to create a protocol-stack-specific protocol control block. In a streams environment, the protocol-stack-specific streams can be created by making open device function calls to each protocol stack. In an application library a protocol-stack-specific socket may be opened via a protocol-stack-specific socket function call. Thus, the term communications endpoint may represent a protocol control block in a sockets implementation, an open stream in a streams environment, or a socket in an application library.

For a server, an association is made between the application socket and each underlying communications protocol stack. Socket state, protocol-stack-specific communications endpoints, and other information returned by the transport function calls (i.e., the socket attach function calls) may be stored in the pseudo communications endpoint data structure. Once the protocol-stack-specific communications endpoints have been created deferred function calls such as, bind and listen, may be made to each underlying protocol stack.

When the application makes an accept function call the stack multiplexer layer monitors each protocol stack for incoming connection requests. When connection requests are received from remote applications, the stack multiplexer layer completes the accept function calls to the protocol stacks on which the connection requests are received and returns new socket descriptors to the application for subsequent communications with the remote applications. Thus, by creating a stack multiplexer layer that allows a server to transparently communicate with a plurality of communications protocol stacks, the method avoids the difficulties caused by conventional sockets implementations that fix the association between a socket and a single protocol stack at socket creation time.

If the application is determined to be a client, the method may include performing a protocol stack lookup and assigning a protocol stack to the client based on any suitable criteria, such as load sharing, a table lookup of the destination address, or routing tables from the underlying protocol stacks. A client application may be identified by the presence of a connect function call, which is typically made by client applications and not by server applications. When a connect function call is received, the stack multiplexer layer may pend the connect function call, select one of the communications protocol stacks, create a protocol-stack-specific communications endpoint, complete any deferred function calls, and then complete the connect function call on the selected protocol stack. When the stack multiplexer layer makes a connect call to the protocol-stack-specific socket, a connection request is sent to a remote application via the selected communications protocol stack. When the connection request is accepted a remote protocol stack, the protocol-stack-specific connect function call returns. On a successful connection request the stack multiplexer layer populates remote endpoint data structures with an IP address and a port number for the remote application and returns a successful status to the application. The stack multiplexer layer will also forward an error return code to the application in response to a failed connect function call made by the application. Once a connection with a remote application has been established, data is sent to and received from the remote application using the information contained in the socket, pseudo communications endpoint and the protocol-stack-specific communications endpoint. Because of the one-to-one correspondence between the protocol-stack-specific communications endpoint and the socket for a client application, data written by the application to the socket may be directly passed to the underlying protocol stack without processing in the stack multiplexer layer. Similarly, data received from the underlying protocol-stack may be directly written to the application's socket.

Accordingly, it is an object of the invention to provide methods, systems, and computer program products for controlling communications between applications and a plurality of network communications protocol stacks using deferred protocol stack association.

It is another object of the invention to provide a stack multiplexer layer that terminates a socket call made by an application, creates a pseudo communications endpoint, makes the appropriate transport-related function calls depending on whether the application is a client or a server, and associates the pseudo communications endpoint with the communications endpoints in the underlying protocol stacks.

Some of the objects of the invention having been stated hereinabove, and which are addressed in whole or in part by the present invention, other objects will become evident as the description proceeds when taken in connection with the accompanying drawings as best described hereinbelow.

BRIEF DESCRIPTION OF THE DRAWINGS

Preferred embodiments of the invention will now be explained with reference to the accompanying drawings of which.

DETAILED DESCRIPTION OF THE INVENTION

Figure 3:
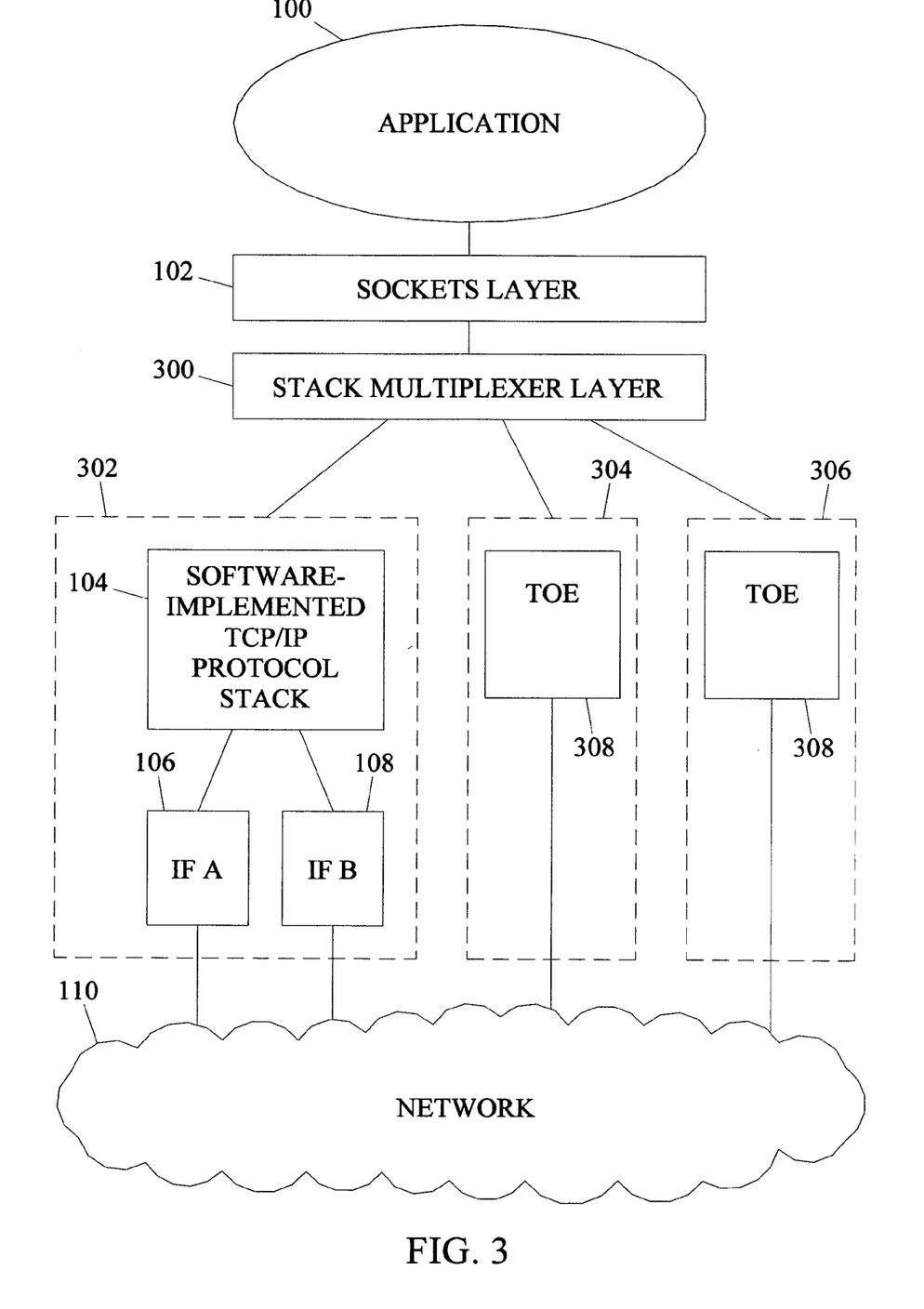
FIG. 3 is a block diagram of an architecture that includes a plurality of network communications protocol stacks and a stack multiplexer layer according to an embodiment of the present invention.

As stated above, the present invention includes methods, systems, and computer program products for controlling communications between an application and a plurality of network communications protocol stacks using deferred protocol stack association. FIG. 3 is a block diagram illustrating an exemplary system for controlling communications between a network application and a plurality of network communications protocol stacks using deferred protocol stack association according to an embodiment of the present invention. Referring to FIG. 3, network application 100 may be a client or a server for communicating with other applications over a network. Sockets layer 102 may be a conventional sockets layer that associates sockets with communications protocol stacks at the time a socket is created. Stack multiplexer layer 300 preferably intercepts calls from the socket layer to the underlying protocol stack and defers association of the sockets with one or more of a plurality of network communications protocol stacks until the nature of the application, i.e., whether the application is a client or a server, can be determined. Stack multiplexer layer 300 may create a pseudo communications endpoint, create one or more protocol-stack-specific communications endpoints, and, after it is determined whether the application is a client or a server, make the appropriate client- or server-related socket function calls to the protocol stacks. Socket layer 102 may return a socket descriptor to the application that the application uses to perform sockets-related functions. Stack multiplexer layer 300 may also maintain associations between sockets and the protocol-stack-specific communications endpoints created by stack multiplexer layer 300. By creating and maintaining the associations between a socket and protocol-stack-specific communications endpoints, stack multiplexer layer 300 enables applications to transparently use any or all of the network communications protocol stacks in a system with multiple network communications protocol stacks. For example, the application is not required to be aware of the details of whether the operating system and/or network communications hardware has a single or multiple protocol stacks. The application simply makes standard sockets function calls to a single socket via a sockets or streams API, and the stack multiplexer layer interfaces with the network communications protocol stack or stacks. Because the application is only required to manage a single socket, application design is simplified over an implementation in which the application is required to manage connections with multiple protocol stacks and/or multiple sockets.

Stack multiplexer layer 300 enables communication between an application and any number of network communications protocol stacks implemented in hardware, software, firmware, or any combination thereof. In the illustrated example, three network communications protocol stacks are included. The first network communications protocol stack 302 includes a software-implemented TCP/IP stack 104 and separate network interfaces 106 and 108. Communications protocol stacks 304 and 306 each include TCP offload engines 308. TCP offload engines 308 offload TCP/IP processing to hardware. TCP/IP offload engines 308 also include integrated network interfaces.

Figure 4A:
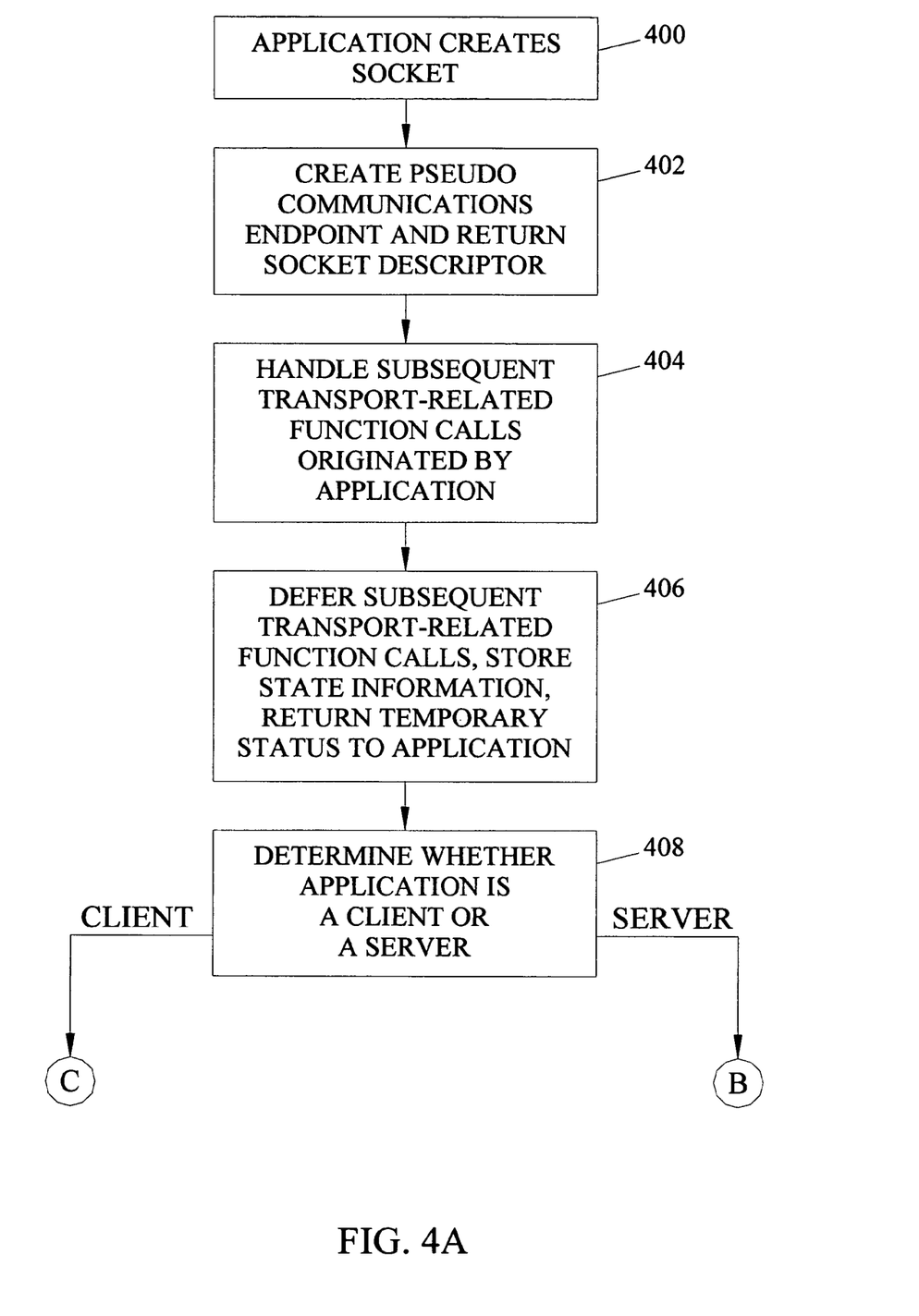
FIGS. 4A-4C are a flow chart illustrating exemplary steps for controlling communications between a network application and multiple network communications protocol stacks using deferred protocol association according to an embodiment of the present invention.
Figure 4B:
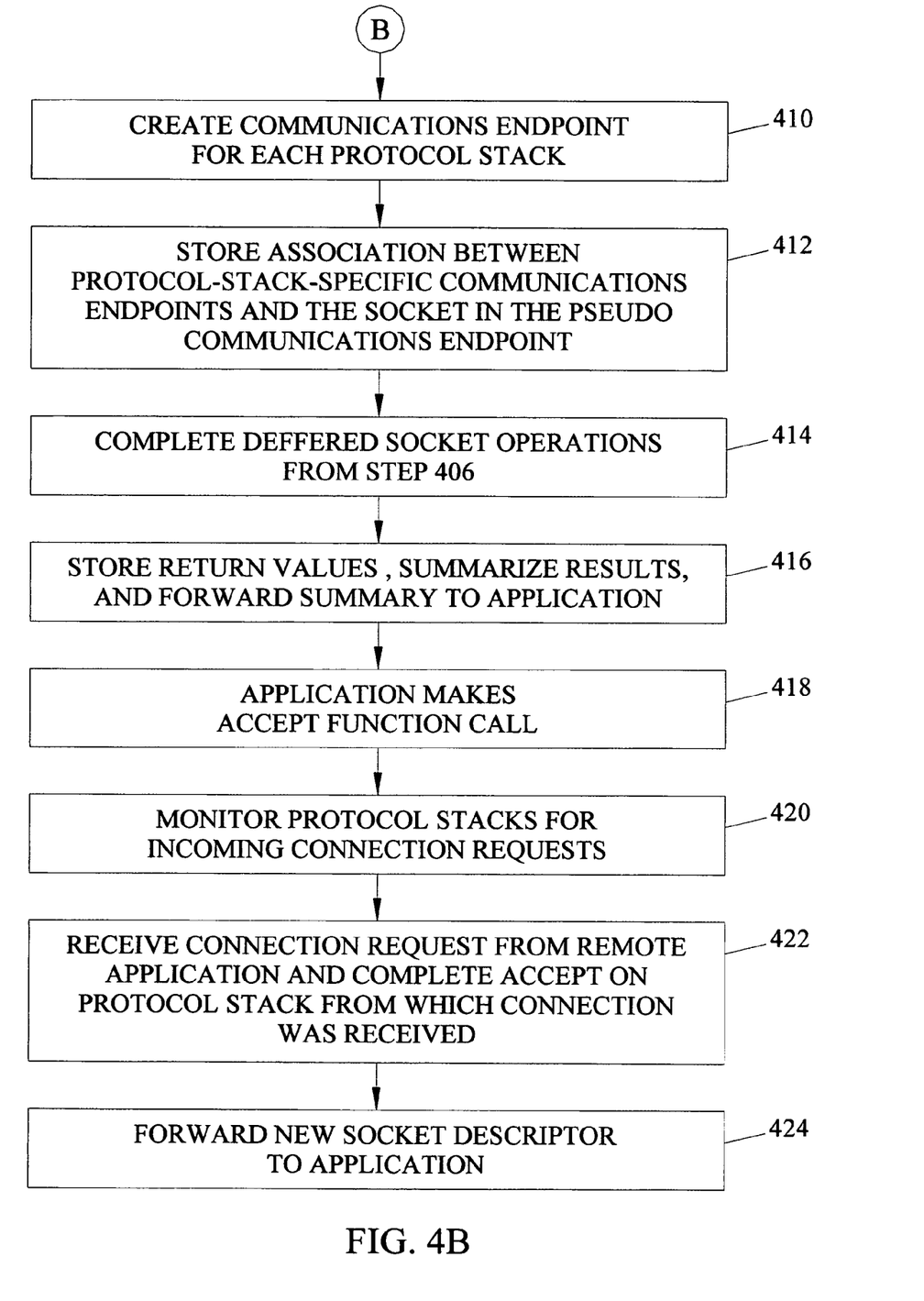
Figure 4C:
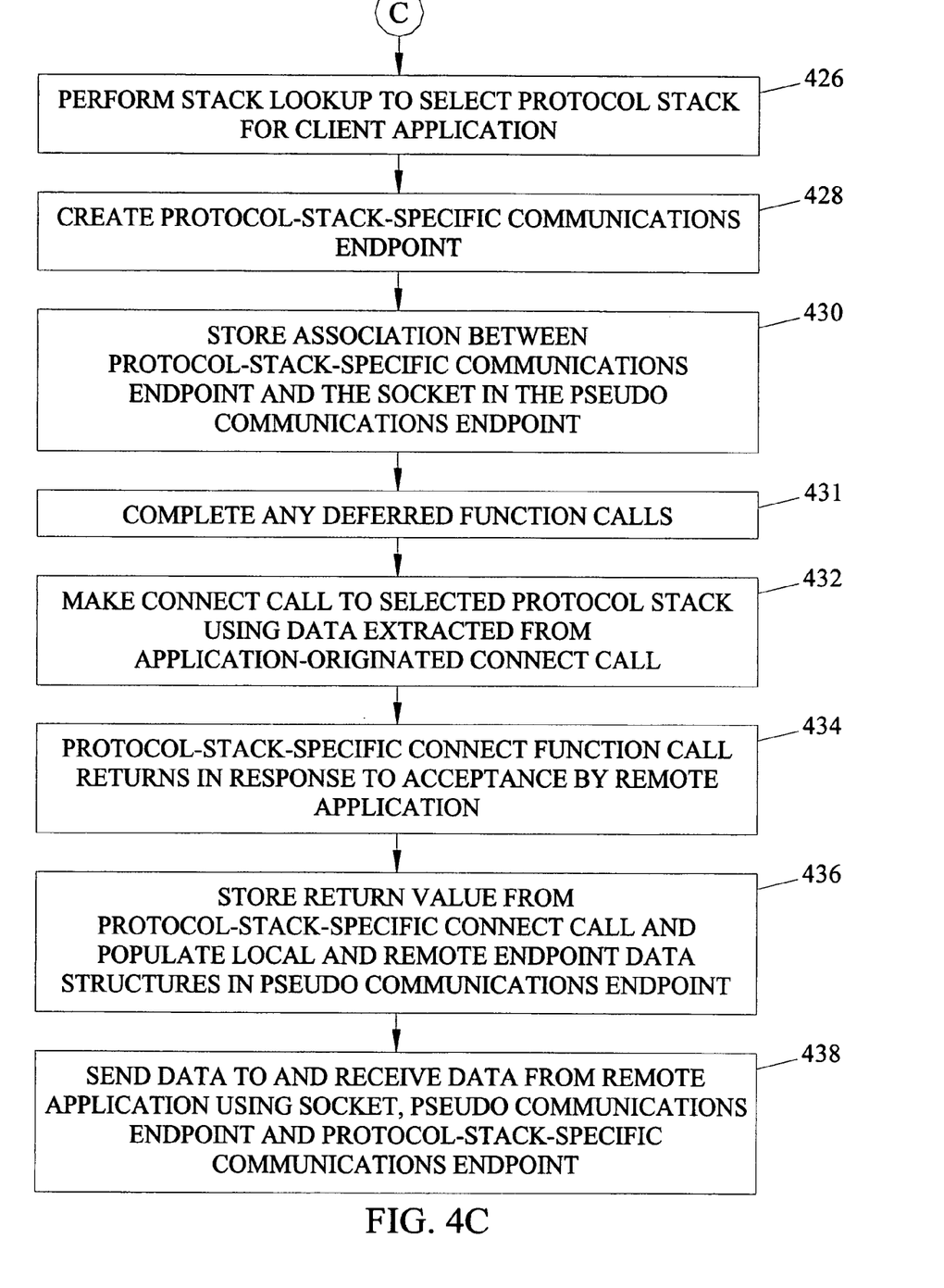

As stated above, stack multiplexer layer 300 detects socket creation function calls from application 100 and defers association of the sockets with one or more of the protocol stacks 302, 304, and 306, until the nature of application 100 can be determined. FIGS. 4A-4C are a flow chart illustrating exemplary steps that may be performed by stack multiplexer layer 300 in controlling communications between application 100 and protocol stacks 302, 304, and 306. Referring to FIG. 4, in step 400, application 100 makes a socket creation call. The socket creation call may be a socket call made using any standard communications API. In response to the socket creation call, a socket descriptor is created and the socket is normally associated with a specific protocol stack. However, rather than associating the socket with a specific protocol stack, in step 402, stack multiplexer layer 300 terminates the socket creation call, creates a pseudo communications endpoint, and the socket descriptor is returned to the application. The pseudo communications endpoint is a data structure that stores information for associating the application's socket with the communications endpoints associated with each protocol stack. For example, the pseudo communications endpoint may store the application's socket descriptor, descriptors that identify each protocol-stack-specific communications endpoint, and state information (i.e., whether the protocol-stack-specific communications endpoint is open, closed, listening, connected, etc.) for each protocol-stack-specific communications endpoint.

In step 404, stack multiplexer layer 300 handles subsequent transport-related function calls originated by the application. By handling transport-related function calls originated by the application, it is meant that stack multiplexer layer 300 intercepts the corresponding calls made to the protocol stack and terminates these calls. Examples of the application-originated function calls may include bind calls, listen calls, and connect calls. As used herein, a bind call refers to a function call that associates a socket with a local endpoint address. A listen call is a call that sets the state of a stream-oriented socket to LISTEN, where the socket is willing to accept incoming connection requests. In some environments, the presence of a bind function call may be sufficient to identify an application as a server. In other environments, client applications may make bind function calls. In these environments, it may be necessary to distinguish clients from servers by the presence of listen function calls, which are typically made only by servers. A connect call is a call that initiates a TCP three-way handshake to connect a socket to a remote endpoint. Connect calls are typically implemented by clients.

Although the terms "bind", "listen", and "connect" are used herein to describe the sockets-related function calls and their associated calls from the socket layer to the transport, these calls are specific to BSD and Winsock sockets implementations, the present invention is not limited to only BSD or Winsock socket calls. The functionality provided by stack multiplexer layer 300 may be used with any socket- or stream-related function calls that perform equivalent functions to the bind, listen, and connect calls without departing from the scope of the invention.

Additional sockets function calls that will be used to describe the functionality of embodiments of the invention include accept, send, and receive function calls. An accept function call is a call used by a server to accept an incoming connection request. A send function call is a call used by clients and servers to send data to a remote application. A receive function call is a call used by clients and servers to receive data from a remote application. As with the sockets-related function calls described above, the accept, send, and receive functions calls are used herein to refer to calls that perform the indicated sockets-related functions and are not intended to be limited to any operating-system-specific sockets function calls.

In step 406, stack multiplexer layer 300 defers the subsequent transport-related-function calls, stores state information so that the requested operations can be performed later, and returns temporary status information to the application. Execution of the application may block unless the sockets-related functions return with successful return codes. For example, in response to the bind function, the application expects a return value indicating whether or not the bind function successfully executed. It is desirable for the application to continue execution before the protocol stack can be selected, so stack multiplexer layer 300 may return a temporary successful return code in response to a bind function or any of the other sockets-related functions that are deferred as described above.

As an example of how steps 406 and 408 may be implemented in practice, when an application makes a bind call, it may be necessary to wait until a listen or connect call is made before determining whether the application is a client or a server. Thus, when the application makes the bind call, stack multiplexer layer 300 handles (i.e., terminates the corresponding call to the protocol stack) the bind function call, stores the local address and port information in the pseudo communications endpoint so that the bind function call can be performed later, and returns a temporary successful return value to the application. Subsequently, if the application makes a listen function call, stack multiplexer layer 300 will conclude the application is a server. If the application makes a connection call the stack multiplexer layer 300 will conclude the application is a client In step 408, stack multiplexer layer 300 determines whether the application is client or a server. This step may be performed by analyzing the sockets-related function call or calls made by the application. For example, if the calls include a bind function, call the application may be identified as a server. In an alternative implementation, a server may be identified by the presence of a listen call. A client application may be identified by the presence of a connect call.

If the application is determined be a server, control proceeds to step 410 where communications endpoints are created for each protocol stack. Stack multiplexer layer 300 may perform step 410 by making the transport-related function calls normally used during socket creation to each protocol stack. Examples of the transport-related function calls may include socket attach function calls for sockets environments or call stream open device and linking function calls for streams environments or call protocol stack specific socket create functions in an application library environment. In step 412, stack multiplexer layer 300 stores the association between the protocol-stack-specific communications endpoints, and the application socket in the pseudo-communications endpoint. In step 414, stack multiplexer layer 300 completes the deferred function calls from step 406. For example, if stack multiplexer layer 300 has received a bind call and a listen call, stack multiplexer layer 300 may execute calls corresponding to a bind call and a listen call to each of the protocol-stack-specific sockets, so that the application will be bound to and listening on all of the protocol stacks. In step 416, stack multiplexer layer 300 stores return values for each of the function calls made in step 414, summarizes the results, and returns the summarized results to the application. For example, if the application is waiting for a return value to the listen function, and all three protocol-stack-specific listen function calls return successfully, stack multiplexer layer 300 may return a single successful return code to the application. Similarly, if any of the protocol-stack-specific listen calls fail, stack multiplexer layer may return an unsuccessful return code to the application.

After stack multiplexer layer 300 has created associations between the applications socket and the underlying protocol stacks and all the underlying protocol-stack specific communications endpoints are passively listening for connections, control proceeds to step 418 where the application makes an accept function call to wait for new connection requests. The accept function call blocks until a connection request is received from a remote application. In step 420, stack multiplexer layer 300 monitors the underlying protocol-stacks for incoming connection requests. Such monitoring may be performed using functionality similar to that provided by a select( ) function call, which allows stack multiplexer layer 300 to monitor a list of socket descriptors to determine if any of the socket descriptors have received a connection request from a remote application. In step 422, one of the underlying protocol stacks 302, 304, and 306 receives a connection request from a remote application, creates a new protocol-stack-specific communications endpoint for the connection and awakens stack multiplexer layer 300 to complete the accept call. Stack multiplexer layer 300 will associate a new socket with the new underlying protocol-stack-specific communications endpoint. The socket descriptor corresponds to a new socket through which subsequent communications with each remote application will occur. In step 424, stack multiplexer layer 300 forwards the new socket descriptor to the application. The application can then use the new socket to communicate directly with the remote application. Steps 420-424 may be executed continuously to accept incoming connection requests from any of the protocol-stack-specific sockets and forward the new socket descriptors to the application. Thus, using the steps illustrated in FIG. 4B, the pseudo-transport allows a server application to transparently communicate with remote applications via multiple network communications protocol stacks.

Returning to step 408 in FIG. 4A, if it is determined that the application is a client, control proceeds to step 426 in FIG. 4C where a stack lookup is performed to select a protocol stack with which the client will be associated. The protocol stack may be selected based on any suitable criteria, such as load sharing criteria. In another example, it may be desirable to select hardware-implemented TCP/IP protocol stacks before software-implemented TCP/IP protocol stacks in order to conserve processor cycles on the host machine. Alternatively, the stack may be selected based on the destination address of the connect call by consulting an IP routing table in one or more of the underlying protocol stacks.

In step 428, stack multiplexer layer 300 creates a protocol-stack-specific communications endpoint. This step may be accomplished by making the transport-related function calls normally used by the kernel during socket creation to the selected communications protocol stack. Examples of the transport-related function calls include socket attach function calls in a sockets environment and call stream device open function calls in a streams environment or call protocol stack specific socket create functions in an application library environment. In step 430, stack multiplexer layer 300 stores an association between the protocol-stack-specific communications endpoints and the socket in the pseudo communications endpoints.

In step 431 any function calls that were deferred in step 406 must be completed. Completing the deferred function calls may include making the sockets layer-to-protocol-stack function calls corresponding to the application-to-sockets layer function calls. In step 432, stack multiplexer layer 300 makes a connect function call using the protocol-stack-specific communications endpoint and data extracted from the application-originated connect function call. The data from the application-originated connect function call may include the socket descriptor and a pointer to the data structure that identifies the remote endpoint with which the application is seeking to connect. In step 434, the protocol-stack-specific connect function call returns in response to a connection acceptance from a remote network communications protocol stack. In step 436, stack multiplexer layer 300 stores the return value received in response to the protocol-stack-specific connect call. Stack multiplexer layer 300 may store the IP address and port number of the local and remote endpoints along with other state in the pseudo communications endpoint.

In step 438, stack multiplexer layer 300 sends data to and receives data from the remote application using the socket and the protocol-stack-specific communications endpoint. Step 438 may include handling send function calls made by the local client application by terminating the original sockets layer-to-stack multiplexer layer send function calls and formulating new send function calls to the specific protocol-stack, or stack multiplexer layer 300 may associate the socket and the underlying protocol stack in a way that stack multiplexer layer 300 need not be directly involved in the sending of data. For receiving data, step 438 may include handling receive function calls made by the local client application by terminating the sockets-layer-to-stack-multiplexer-layer receive function calls and formulating new receive function calls to the specific protocol-stack or the stack multiplexer layer 300 may associate the socket and underlying protocol stack in a way that stack multiplexer layer 300 need not be directly involved in the receiving of data. In one exemplary implementation the stack multiplexer 300 acts as a proxy and passes data and subsequent socket-related function calls between sockets layer 102 and the underlying protocol stack. In another exemplary implementation, stack multiplexer 300 may set up the socket data structure and the underlying communications endpoint so that the socket data structure and the underlying communications endpoint are directly connected, thus bypassing the pseudo communications endpoint for data transmissions and subsequent socket-related calls. Thus, using the steps illustrated in FIG. 4C, a client application can be associated with any communications protocol stack of a plurality of communications protocol stacks for sending and receiving data.

Figure 5:
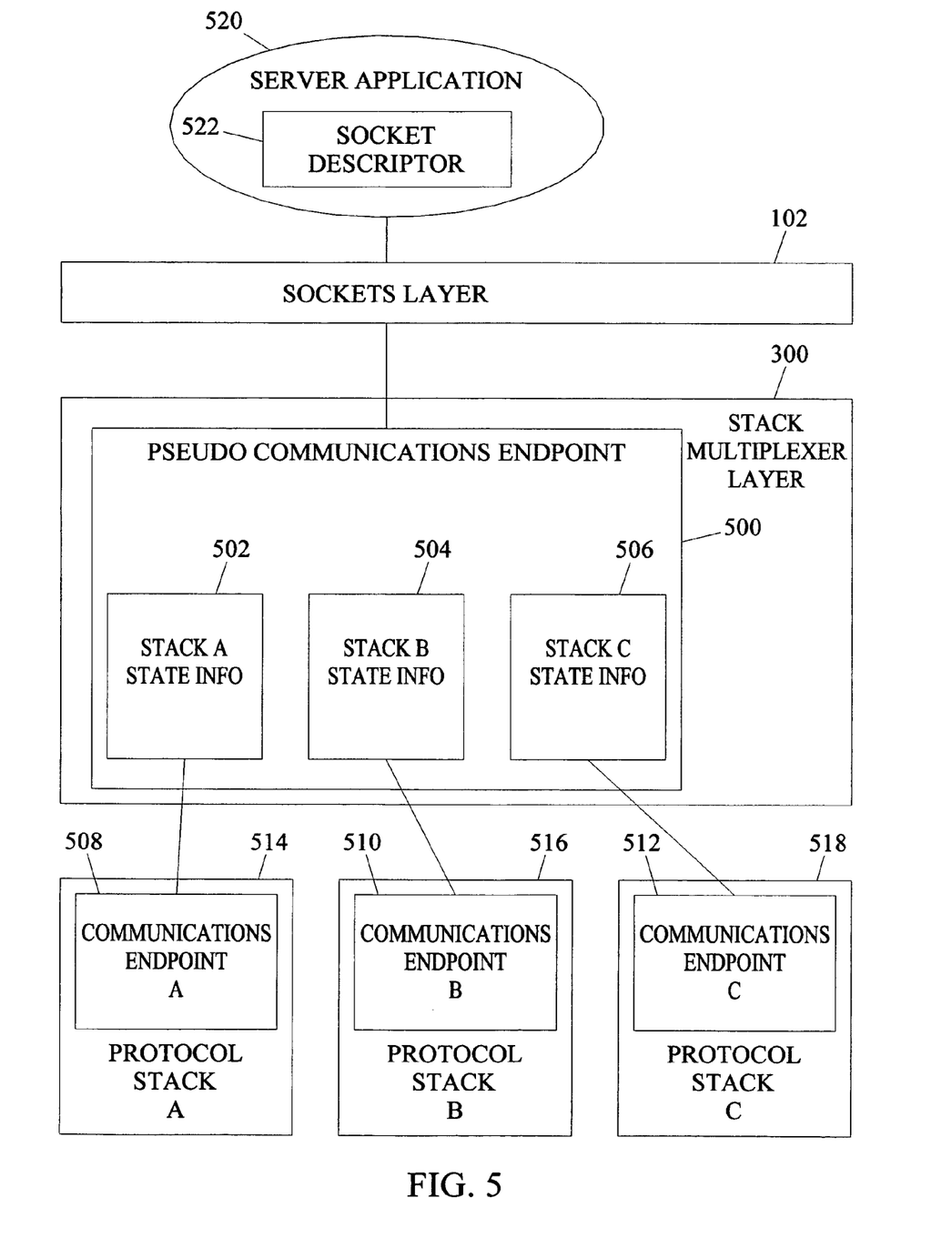
FIG. 5 is a block diagram illustrating an exemplary server application according to an embodiment of the present invention.

FIG. 5 is a block diagram illustrating an exemplary server pseudo communications endpoint for communication between a server application and multiple protocol stacks according to an embodiment of the present invention. Referring to FIG. 5, pseudo communications endpoint 500 stores per-stack information in stack-state info blocks 502, 504, and 506. Each stack state info block 502, 504, and 506 may contain a protocol-stack-specific handles, a pointer to a communications endpoint, a pointer to the associated socket and may also include cached information from the socket and any other per-protocol-stack state information. In the illustrated example one stack state block 502, 504, and 506 is present for each underlying set of protocol-stack-specific handles and communications endpoints 508, 510, and 512 associated with protocol stacks 514, 516, and 518, respectively. Stack multiplexer layer 300 uses the protocol-stack-specific handles to make protocol-stack-specific function calls. The state information stored by pseudo communications endpoint 500 may also include deferred function calls made by server application 520, the status of the function calls, protocol-stack-specific function calls made by stack multiplexer layer 300, and the status of those function calls. Thus, server pseudo communications endpoint 500 allows connection requests received from any of a plurality of protocol-stacks to be multiplexed into a single socket and delivered to server application 520. In addition, server pseudo communications endpoint 500 allows connection acceptances made by server application 520 to be demultiplexed and received over any of a plurality of protocol-stack-specific sockets. Such transparent multiplexing and demultiplexing capability has not been provided by previous sockets implementations. The transparent multiplexing and demultiplexing capability provided by stack multiplexer layer 300 can be contrasted with the multiplexing and demultiplexing functionality provided by a select( ) function call, which requires that the application continuously monitor multiple socket descriptors to determine if the corresponding sockets are ready to accept connections or send and receive data.

Figure 6:
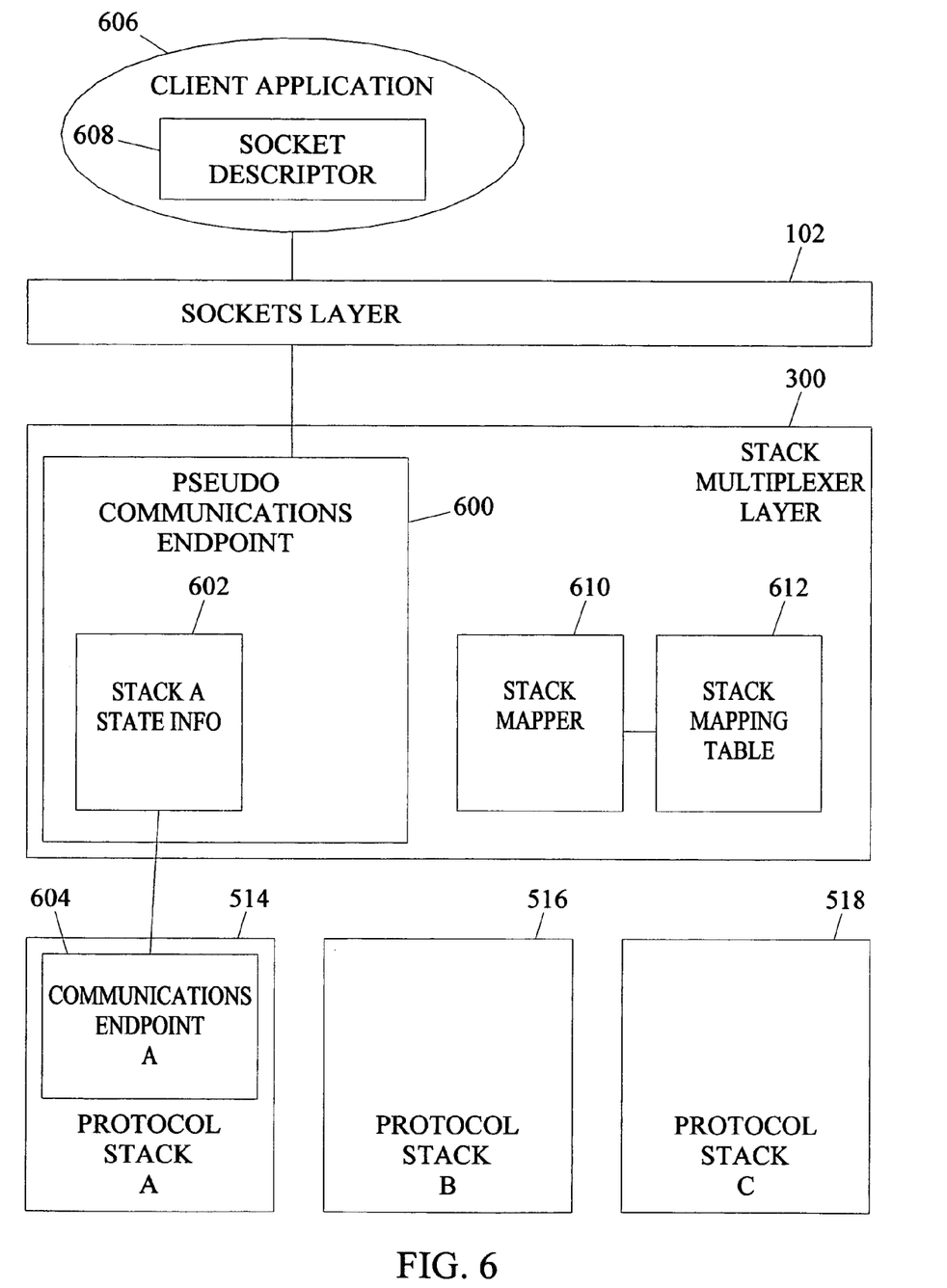
FIG. 6 is a block diagram illustrating an exemplary client application according to an embodiment of the present invention.

FIG. 6 illustrates an exemplary client pseudo communications endpoint according to an embodiment of the present invention. In FIG. 6, client pseudo communications endpoint 600 stores a protocol-stack-specific state information 602. In the illustrated example, protocol-stack-specific state information 602 may include protocol-stack-specific handles and pointers to protocol-stack-specific communications endpoint 604 in protocol stack 514. Client application 606 identifies pseudo communications endpoint 600 using socket descriptor 608 assigned when stack multiplexer layer 300 terminated the original socket call made by the application. Stack multiplexer 300 includes a stack mapper 610 for selecting the protocol stack to which the pseudo communications endpoint will be assigned based on data stored in stack mapping table 612. Stack mapping table 612 may include dynamically updated stack selection information, such as current utilization of each protocol stack, static information, such as static mappings between client applications and protocol stacks, or routing tables maintained by the underlying protocol stacks. Such routing tables may be static routing tables or routing tables that are dynamically updated via network routing protocols, such as RIP or OSPF.

Although the examples illustrated in FIGS. 5 and 6 include a single pseudo-communications endpoint associated with protocol stacks 514, 516, and 518, stack multiplexer layer 300 is not limited to generating a single pseudo communications endpoint. Multiple pseudo communications endpoints may be created and associated with any number of protocol stacks without departing from the scope of the invention. For example, stack multiplexer layer 300 may create and maintain multiple pseudo communications endpoints for multiple client and/or server applications executing on the host machine.

In addition, in the example illustrated in FIG. 3, separate stack multiplexer and sockets layers have been shown to reflect a modular implementation of stack multiplexer layer 300. However, functionality provided by these layers may be combined without departing from the scope of the invention. In such a combined implementation, stack multiplexer layer 300 may store socket creation function calls until the nature of the application can be determined. Once the nature of the application is determined, stack multiplexer layer 300 may modify the socket creation function calls and/or make additional socket creation function calls to the protocol-stack-specific sockets. Subsequent sockets-related function calls received from an application may be made to the appropriate underlying protocol stacks, as described above.

Although in the examples described above, stack multiplexer layer 300 terminates sockets-layer-to-transport function calls and makes the corresponding kernel function calls to the appropriate protocol stack, the present invention is not limited to a kernel-implemented stack multiplexer layer. In an alternate embodiment, stack multiplexer layer 300 may be implemented as an application library that an application uses to access multiple protocol stacks using sockets-related function calls to a single protocol stack. In an application-library implementation, stack multiplexer layer 300 may perform similar functionality to that described above by intercepting and deferring sockets functions calls made by the application, determining whether the application is a client or a server and making the corresponding sockets function calls to an underlying sockets layer. The underlying sockets layer may then communicate with the individual protocol stacks.

Thus, the present invention includes methods, systems, and computer program products for transparently controlling communications between a network application and a plurality of network communications protocol stacks. By deferring stack association from the time a socket call is made until the nature of the application can be determined and protocol-stack-specific communications endpoints can be created, the methods, systems, and computer program products described herein enable the application to see a single socket while multiple protocol stacks underlie that socket. As a result, the application can communicate with multiple communications protocol stacks using standard sockets function calls and without the increased complexity required to manage communication with multiple protocol stacks.

It will be understood that various details of the invention may be changed without departing from the scope of the invention. Furthermore, the foregoing description is for the purpose of illustration only, and not for the purpose of limitation, as the invention is defined by the claims as set forth hereinafter.

What is claimed is:

1. A method for transparently controlling communications between a network application and a plurality of network communications protocol stacks, the method comprising:
   in a stack multiplexer layer located between the network application and the plurality of network communication protocol stacks:
   (a) intercepting a socket creation function call generated by the network application using an application programming interface;
   (b) creating a pseudo communications endpoint in response to the socket creation function call;
   (c) intercepting at least one sockets-related function call to the socket of step (a);
   (d) determining whether the application comprises a client or a server based on the sockets-related function call; and
   (e) based on the determination in step (d), creating at least one protocol-stack-specific communications endpoint and making client- or server-related socket function calls from the stack multiplexer layer to at least one of the plurality of network communications protocol stacks using the at least one protocol-stack-specific communications endpoint and the application programming interface.

2. The method of claim 1 wherein, in response to determining that the application comprises a server, step (e) includes:
   (i) creating a protocol-stack-specific communications endpoint corresponding to each of the communications protocol stacks and storing descriptors for each protocol-stack-specific communications endpoint; and
   (ii) making server-related socket function calls for each of the protocol-stack-specific communications endpoints.

3. The method of claim 1 wherein intercepting a socket creation function call and creating a pseudo communications endpoint includes terminating the socket creation function call and returning a socket descriptor to the application, the socket descriptor being associated with the pseudo communications endpoint.

4. The method of claim 1 wherein intercepting at least one sockets-related function call includes intercepting a bind function call for binding the pseudo communications endpoint to a local IP address and port and wherein determining whether the application comprises a client or a server includes identifying the application as a server based on the bind function call.

5. The method of claim 1 wherein intercepting at least one sockets-related function call includes intercepting a listen function call for listening on the pseudo communications endpoint and wherein determining whether the application comprises a client or server includes identifying the application as a server based on the presence of the listen function call.

6. The method of claim 1 wherein intercepting at least one sockets-related function call includes intercepting a connect call and wherein determining whether the application comprises a client or a server comprises identifying the application as a client based on the presence of the connect function call.

7. The method of claim 4 wherein making server-related socket function calls for each of the protocol-stack-specific communication endpoints includes making a bind function call to each of the underlying protocol-stacks.

8. The method of claim 5 wherein making server-related socket function calls for each of the protocol-stack-specific communication endpoints includes making a listen function call to each of the underlying protocol-stacks.

9. The method of claim 8 comprising intercepting an accept function call.

10. The method of claim 9 comprising, in response to the accept function call, monitoring each of the protocol-stack-specific communication endpoints for incoming connection requests.

11. The method of claim 10 comprising receiving connection requests on any of the protocol-stack-specific communication endpoints, accepting the connection requests, and forwarding new socket descriptors to the application for communicating with the remote applications.

12. The method of claim 1 comprising, in response to identifying the application as a client, performing a stack lookup to select a network communications protocol stack from the plurality of network communications protocol stacks, creating a communications endpoint associated with the selected communications protocol stack, the communications endpoint being directly associated with the socket created by the application, thereby bypassing the pseudo communications endpoint.

13. The method of claim 12 comprising sending and receiving data via the socket created by the application and the communication endpoint.

14. The method of claim 1 comprising, in response to identifying the application as a client, performing a stack lookup to select a network communications protocol stack from the plurality of network communications protocol stacks, creating a communications endpoint associated with the selected communications protocol stack, and associating the communication endpoint with the pseudo communications endpoint.

15. The method of claim 14 comprising, in response to identifying the remote application as a client, making a connect function call using the protocol-stack-specific communication endpoint.

16. The method of claim 15 comprising receiving a return code from the protocol-stack-specific connect function call in response to a connection acceptance by a remote network communications protocol stack.

17. The method of claim 16 comprising returning the connect return code to the client and populating remote endpoint address data structures in the pseudo communications endpoint.

18. The method of claim 17 comprising sending data to and receiving data from the remote application using the pseudo communications endpoint and the protocol-stack-specific communications endpoint.

19. The method of claim 18 wherein sending data to and receiving data from the remote application using the pseudo communications endpoint and the protocol-stack-specific socket includes intercepting send function calls and making send function calls via the protocol-stack-specific socket and intercepting receive function calls and making receive function calls via the protocol-stack-specific socket.

20. A method for controlling communications between a network application and a plurality of network communications protocol stacks, the method comprising:

in a stack multiplexer layer located between the network application and the plurality of network communications protocol stacks:
(a) intercepting a socket creation function call generated by the network application using an application programming interface;
(a) receiving a socket creation function call for creating a socket for communications between a network application and one of a plurality of network communications protocol stacks;
(b) deferring association between the socket and one or more of the network communications protocol stacks until a determination can be made as to whether the application is a client or a server; and
(c) in response to determining whether the application is a client or a server, associating the socket with one or more of the network communications protocol stacks by making at least one socket related function call from the stack multiplexer layer to the one or more network communications protocol stacks using the application programming interface.

21. A system for controlling communication between a local network application and a plurality of communications protocol stacks, the system comprising:

within a computer:
(a) a stack multiplexer layer located between the network application and the plurality of communications protocol stacks, the stack multiplexer layer for receiving a socket-creation function call generated by the local network application using an application programming interface, for terminating the socket-creation function call, and for making a protocol-stack-specific socket function call from the stack multiplexer layer to at least one of plurality of network communications protocol stacks, using the application programming interface, and based on the socket creation function call to create at least one protocol-stack-specific communications endpoint; and
(b) the plurality of network communications protocol stacks for transporting data between the local network application and a remote application via the at least one protocol-stack-specific communications endpoint.

22. The system of claim 21 wherein the stack multiplexer layer is adapted to determine whether the local application comprises a client or a server, and, in response to determining that the local application is a server, the stack multiplexer layer is adapted to create a protocol-stack-specific communications endpoint on each of the network communications protocol stacks, to intercept server-related socket function calls, and to make the server-related socket function calls to each of the communications protocol stacks.

23. The system of claim 22 wherein the stack multiplexer layer is adapted to make bind function calls to each of the network communications protocol stacks.

24. The system of claim 23 wherein the stack multiplexer layer is adapted to make listen function calls to each of the network communications protocol stacks.

25. The system of claim 24 wherein the stack multiplexer layer is adapted to monitor the network communications protocol stacks for incoming connection requests and to accept received connection requests on behalf of the application.

26. The system of claim 21 wherein the stack multiplexer layer is adapted to determine whether the local application comprises a client or a server, and, in response to determining that the local application comprises a client, the stack multiplexer layer is adapted to select one of the plurality of network communications protocol stacks, to intercept client sockets-related function calls, and to make the client-related socket function calls to the selected network communications protocol stack.

27. The system of claim 26 wherein the stack multiplexer layer is adapted to make a connect function call to the selected network communications protocol stack.

28. The system of claim 27 wherein the stack multiplexer layer is adapted to make a receive function call to the selected network communications protocol stack.

29. The system of claim 28 wherein the stack multiplexer layer is adapted to make a send function call to the selected network communications protocol stack.

30. The system of claim 21 wherein the at least one protocol-stack-specific communications endpoint comprises at least one protocol control block.

31. The system of claim 21 wherein the at least one protocol-stack-specific communications endpoint comprises at least one stream.

32. The system of claim 21 wherein the at least one protocol-stack-specific communications endpoint comprises at least one socket.

33. The system of claim 21 wherein the network communications protocol stacks include TCP/IP protocol stacks.

34. The system of claim 33 wherein the network communications protocol stacks include at least one software-implemented TCP/IP protocol stack.

35. The system of claim 33 wherein the network communications protocol stacks include at least one hardware-implemented TCP/IP protocol stack.

36. A computer program product comprising computer-executable instructions embodied in a computer-readable medium for performing steps comprising:
at a stack multiplexer layer located between a network application and a plurality of network communications protocol stacks:
(a) intercepting a socket creation function generated by the network application using an application programming interface;
(b) creating a pseudo communications endpoint in response to the socket creation function call;
(c) intercepting at least one sockets-related function call relating to the socket of step (a);
(d) determining whether the application comprises a client or a server based on the sockets-related function call; and
(e) based on the determination in step (d), creating at least one protocol-stack-specific communications endpoint and making client- or server-related socket function calls from the stack multiplexer layer to at least one of the plurality of network communications protocol-stacks using the application programming interface and the at least one protocol-stack-specific communications endpoint.

37. The computer program product of claim 36 wherein, in response to determining that the application comprises a server, step (e) includes:
(i) creating a protocol-stack-specific communications endpoint corresponding to each of the communications protocol stacks and storing descriptors for each protocol-stack-specific communications endpoint; and
(ii) making server-related socket function calls for each of the protocol-stack-specific communications endpoints.

38. The computer program product of claim 36 wherein intercepting at least one socket creation function call and creating a pseudo communications endpoint includes terminating the socket creation function call returning a socket descriptor to the application, the socket descriptor being associated with the pseudo communications endpoint.

39. The computer program product of claim 36 wherein intercepting at least one sockets-related function call includes intercepting a bind function call for binding the pseudo communications endpoint to a local IP address and port and wherein determining whether the application comprises a client or a server includes identifying the application as a server based on the bind function call.

40. The computer program product of claim 36 wherein intercepting at least one sockets-related function call includes intercepting a listen function call for listening on the pseudo communications endpoint and wherein determining whether the application comprises a client or server includes identifying the application of the server based on the presence of the listen function call.

41. The computer program product of claim 36 wherein intercepting at least one sockets-related function call includes intercepting a connect call and wherein determining whether the application comprises a client or a server comprises identifying the application as a client based on the presence of the connect function call.

42. The computer program product of claim 39 wherein making server-related socket function calls for each of the protocol-stack-specific communication endpoints includes making a bind function call to each of the underlying protocol stacks.

43. The computer program product of claim 40 wherein making server-related socket function calls for each of the protocol-stack-specific communications endpoints includes making a listen function call to each of the underlying protocol-stacks.

44. The computer program product of claim 43 comprising intercepting an accept function call.

45. The computer program product of claim 44 comprising, in response to the accept function call, monitoring each of the protocol-stack-specific communications endpoints for incoming connection requests.

46. The computer program product of claim 45 comprising receiving connection requests on any of the protocol-stack-specific communications endpoints, accepting the connection requests, and forwarding new socket descriptors to the application for communicating with the remote application.

47. The computer program product of claim 36 comprising, in response to identifying the application as a client, performing a stack lookup to select a network communications protocol stack from the plurality of network communications protocol stacks, creating a communications endpoint associated with the selected network communications protocol stack, and associating the communications endpoint directly with the socket created by the application, thereby bypassing the pseudo communications endpoint.

48. The computer program product of claim 47 comprising sending and receiving data via the socket created by the application and the communications endpoint.

49. The computer program product of claim 36 comprising, in response to identifying the application as a client, performing a stack lookup to select a network communications protocol stack form the plurality of network communications protocol stacks, creating a communication endpoint associated with the selected communications protocol stack, and associating the socket with the pseudo communications endpoint.

50. The computer program product of claim 49 comprising, in response to identifying the remote application as a client, making a connect function call using the protocol-stack-specific communications endpoint.

51. The computer program product of claim 50 comprising receiving a return code from the protocol-stack-specific connect function call in response to a connection acceptance by a remote network communications protocol stack.

52. The computer program product of claim 51 comprising returning the connect return code to the client and populating remote endpoint address data structures in the pseudo communications endpoint.

53. The computer program product of claim 52 comprising sending data to and receiving data from the remote application using the pseudo communications endpoint and the protocol-stack-specific communications endpoint.

* * * * *